United States Patent
Jang

(10) Patent No.: US 11,294,628 B2
(45) Date of Patent: Apr. 5, 2022

(54) PROCESSING ELEMENT AND PROCESSING SYSTEM

(71) Applicant: SK hynix Inc., Gyeonggi-do (KR)

(72) Inventor: Jae-Hyeok Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 146 days.

(21) Appl. No.: 16/702,099

(22) Filed: Dec. 3, 2019

(65) Prior Publication Data

US 2020/0334013 A1 Oct. 22, 2020

(30) Foreign Application Priority Data

Apr. 18, 2019 (KR) .................. 10-2019-0045745

(51) Int. Cl.
| | | |
|---|---|---|
| *G06F 7/492* | (2006.01) | |
| *G06F 7/50* | (2006.01) | |
| *G06F 7/544* | (2006.01) | |
| *G06N 3/063* | (2006.01) | |

(52) U.S. Cl.
CPC .............. *G06F 7/4925* (2013.01); *G06F 7/50* (2013.01); *G06F 7/5443* (2013.01); *G06N 3/063* (2013.01); *G06F 2207/4824* (2013.01)

(58) Field of Classification Search
CPC .......... G06F 17/15; G06F 7/38; G06F 7/4824; G06F 7/49; G06F 7/492; G06F 7/4925; G06F 7/4985; G06F 7/50; G06F 7/52; G06F 7/5443; G06F 2207/4824; G06N 3/04; G06N 3/063
See application file for complete search history.

(56) References Cited

U.S. PATENT DOCUMENTS

2018/0046897 A1  2/2018  Kang et al.

OTHER PUBLICATIONS

J. Wang et al., Design Flow of Accelerating Hybrid Extremely Low Bit-width Neural Network in Embedded FPGA, 2018 International Conference on Field-Programmable Logic and Applications, IEEE 2018 (Year: 2018).*
H. Kim et al., NAND-Net: Minimizing Computational Complexity of In-Memory Processing for Binary Neural Networks, 2019 IEEE International Symposium on High Performance Computer Architecture (HPCA), Feb. 16-20, 2019, IEEE 2019 (Year: 2019).*
M.P. Heinrich et al., TernaryNet: faster deep model inference without GPUs for medical 3D segmentation using sparse and binary convolutions, International Journal of Computer Assisted Radiology and Surgery, 2108 (Year: 2018).*
X. Zhou et al., Cambricon-S: Addressing Irregularity in Sparse Neural Networks through A Cooperative Software/Hardware Approach, 2018 51st Annual IEEE/ACM International Symposium on Microarchitecture, IEEE 2018 (Year: 2018).*
Y. Boo et al., Structure Sparse Ternary Weight Coding of Deep Neural Networks for Efficient Hardware Implementations, IEEE 2017 (Year: 2017).*

* cited by examiner

*Primary Examiner* — Emily E Larocque
(74) *Attorney, Agent, or Firm* — IP & T Group LLP

(57) ABSTRACT

A processing element may include a pre-processing circuit configured to receive and filter a feature and a weight and output a filtered feature and a filtered weight; and an accumulation circuit configured to accumulate a value of the filtered feature, wherein the pre-processing circuit comprises: a sign conversion circuit configured to change a sign of the feature and a sign of the weight when the weight having a value of −1; and a zero filtering circuit configured to change a value of the weight to 0 when the feature having a value of 0.

23 Claims, 5 Drawing Sheets

FIG. 1

| 110 | | | |
|-----|-----|------|---|
| 0.3 | 1.2 | -0.2 | 0 |

| 120 | | | |
|---|---|----|----|
| 1 | 0 | -1 | -1 |

Convolution : 0.3*1 + 1.2*0 + -0.2*-1 + 0*-1 = 0.5

FIG. 4

| FEATURE | | | | | FEATURE_SIGN | | | | | FEATURE_FILTERED | | | |
|---|---|---|---|---|---|---|---|---|---|---|---|---|---|
| 0.3 | 1.2 | -0.2 | 0 | | 0.3 | 1.2 | 0.2 | 0 | | 0.3 | 0 | 0.2 | 0 |

| WEIGHT | | | | | WEIGHT_SIGN | | | | | WEIGHT_FILTERED | | | |
|---|---|---|---|---|---|---|---|---|---|---|---|---|---|
| 1 | 0 | -1 | -1 | | 1 | 0 | 1 | 1 | | 1 | 0 | 1 | 0 |

FIG. 5

| FEATURE |
|---|
| 0.3 | 1.2 | -0.2 | 0 |

| FEATURE_SIGN |
|---|
| -0.3 | 1.2 | -0.2 | 0 |

| FEATURE_FILTERED |
|---|
| -0.3 | 0 | -0.2 | 0 |

| WEIGHT |
|---|
| 1 | 0 | -1 | -1 |

| WEIGHT_SIGN |
|---|
| -1 | 0 | -1 | -1 |

| WEIGHT_FILTERED |
|---|
| -1 | 0 | -1 | 0 |

PROCESSING ELEMENT AND PROCESSING SYSTEM

CROSS-REFERENCE TO RELATED APPLICATION

This application claims priority under 35 U.S.C. § 119 to Korean Patent Application No. 10-2019-0045745 filed on Apr. 18, 2019, which is incorporated herein by reference in its entirety.

BACKGROUND

1. Field

Various embodiments relate to a processing system.

2. Discussion of the Related Art

A convolution neural network (CNN) is a processing system mainly used for image recognition and analysis. The processing system performs a convolution operation of extracting features from an image through a specific filter.

Recently, a binarized neutral network (BNN) has emerged. The BNN aims at simplifying a structure of the processing system and reducing power consumption by using two weights such as binary (using only 1 and −1 as weights) or three weights such as ternary (using only 1, 0, and −1 as weights).

SUMMARY

Various embodiments are directed to a technology of simplifying a structure of a processing system and reducing current consumption.

In an embodiment, a processing element may include: a pre-processing circuit configured to receive and filter a feature and a weight and output a filtered feature and a filtered weight; and an accumulation circuit configured to accumulate a value of the filtered feature, wherein the pre-processing circuit comprises: a sign conversion circuit configured to change a sign of the feature and a sign of the weight when the weight having a value of −1; and a zero filtering circuit configured to change a value of the weight to 0 when the feature having a value of 0.

In another embodiment, a pre-processing circuit configured to receive and filter a feature and a weight and output a filtered feature and a filtered weight; and an accumulation circuit configured to accumulate a value of the filtered feature, wherein the pre-processing circuit comprises: a sign conversion circuit configured to change a sign of the feature and a sign of the weight when the weight having a value of 1; and a zero filtering circuit configured to change a value of the weight to 0 when the feature having a value of 0.

In an embodiment, a processing system may include: a cache memory configured to store a feature and a weight; and a processing element configured to operate the feature and the weight transferred from the cache memory, wherein the processing element comprises: a pre-processing circuit configured to receive and filter the feature and the weight and output a filtered feature and a filtered weight; and an accumulation circuit configured to accumulate a value of the filtered feature, and the pre-processing circuit comprises: a sign conversion circuit configured to change a sign of the feature and a sign of the weight when the weight having a value of −1; and a zero filtering circuit configured to change a value of the weight to 0 when the feature having a value of 0.

In another embodiment, a processing system may include: a cache memory configured to store a feature and a weight; and a processing element configured to operate the feature and the weight transferred from the cache memory, wherein the processing element comprises: a pre-processing circuit configured to receive and filter the feature and the weight and output a filtered feature and a filtered weight; and an accumulation circuit configured to accumulate a value of the filtered feature, and the pre-processing circuit comprises: a sign conversion circuit configured to change a sign of the feature and a sign of the weight when the weight having a value of 1; and a zero filtering circuit configured to change a value of the weight to 0 when the feature having a value of 0.

In an embodiment, a processing element may include: a conversion circuit suitable for receiving input features and weights associated with image data, detecting whether each of the input features and weights has a first value, and selectively converting corresponding values of the input features and weights based on the detecting result to output converted features and weights; a filtering circuit suitable for receiving the converted features and weights, determining whether each of the converted features and weights has a second value, and filtering corresponding values of the converted features and weights based on the detecting result to output filtered features and weights; and an adder suitable for receiving the filtered features including a current filtered feature and a previous filtered feature, and adding the current filtered feature and the previous filtered feature based on a value of a corresponding filtered feature among the filtered weights, wherein each of the input features and weights has one of three values, and each of the converted features and weights has one of two values.

According to the embodiments, it is possible to simplify a structure of a processing system and reduce current consumption.

BRIEF DESCRIPTION OF THE DRAWINGS

FIG. 1 is a diagram illustrating a convolution operation performed by a processing system.

FIG. 4 is a diagram illustrating an example of an operation of a pre-processing circuit in accordance with an embodiment.

FIG. 5 is a diagram illustrating another example of an operation of a pre-processing circuit in accordance with an embodiment.

DETAILED DESCRIPTION

Figure 2:
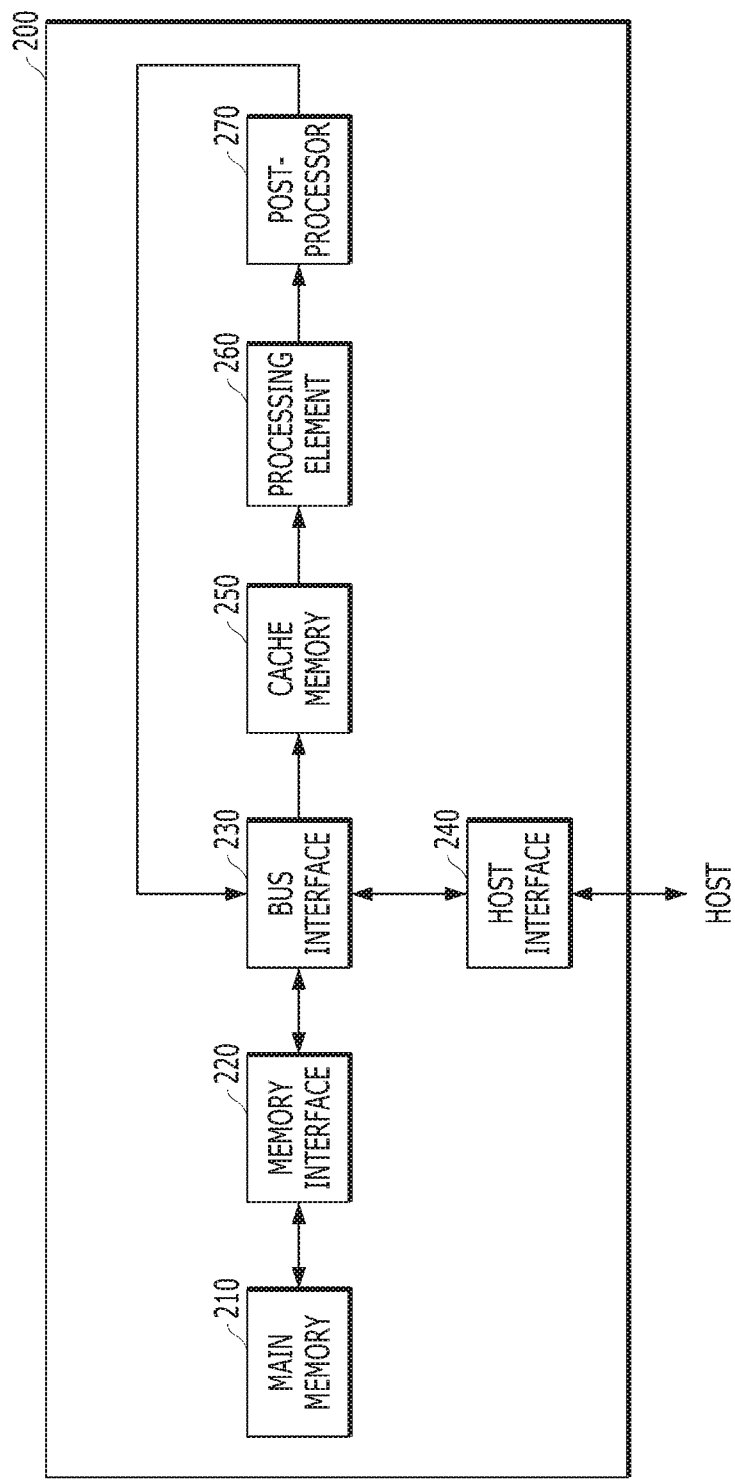
FIG. 2 is a diagram illustrating a processing system in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

FIG. 1 is a diagram illustrating a convolution operation performed by a processing system.

Referring to of FIG. 1, reference numeral 110 may indicate an image data inputted to the processing system. Values of the image data are referred to as features and FIG. 1 illustrates that the image 110 includes four features. However, the number of features is not limited to just four, and the image 110 may also include a larger or fewer number of features.

Reference numeral 120 may indicate a filter. Values included in the filter 120 may be referred to as weights. The weights may correspond to the features, respectively. FIG. 1 illustrates that the weight is one of three values of 1, 0, and −1, which is referred to as a ternary weight.

The convolution operation may be performed by multiplying the feature by the weight and adding the multiplied values. For example, the convolution operation for the image and the filter of FIG. 1 may be performed as (0.3*1)+(1.2*0)+(−0.2*−1)+(0*−1)=0.5. That is, in general the convolution operation includes the multiplication and addition operations.

FIG. 2 is a diagram illustrating a processing system 200 in accordance with an embodiment.

Referring to FIG. 2, the processing system 200 may include a main memory 210, a memory interface 220, a bus interface 230, a host interface 240, a cache memory 250, a processing element 260, and a post-processor 270.

The main memory 210 may be a large-capacity memory that stores an image (that is, features included in the image) and a filter (that is, weights included in the filter). As the main memory 210, a dynamic random access memory (DRAM) may be used and other types of memories may also be used.

The memory interface 220 may be used to access the main memory 210.

The host interface 240 may be an interface for communication with a host HOST. Through the host interface 240, various types of commands and data to be processed by the processing system 200 may be received from the host HOST, for example, a central processing unit (CPU). Furthermore, through the host interface 240, a processing result of the processing system 200 may be transferred to the host.

The cache memory 250 may store features and weights to be operated by the processing element 260. The cache memory 250 may be implemented with a static random access memory (SRAM). The cache memory 250 may be used in order to minimize access latency between the main memory 210 and the processing element 260.

The bus interface 230 may be an interface for components within the processing system 200, i.e., an interface for interfacing the host interface 240, the memory interface 220, and the cache memory 250. The bus interface 230 may store an image and a filter, which are received through the host interface 240, in the main memory 210 through the memory interface 220. Further, the bus interface 230 may read features and weights, which are subjected to a convolution operation by the processing element 260, from the main memory 210 through the memory interface 220. Further, the bus interface 230 may load the read features and weights into the cache memory 250. Furthermore, the bus interface 230 may transfer the processing result of the processing system 200 to the host HOST through the host interface 240.

The processing element 260 may perform a convolution operation of the features FEATURE and the weights WEIGHT received from the cache memory 250. The configuration and operation of the processing element 260 will be described in detail with reference to FIG. 3 to FIG. 5. Although FIG. 2 illustrates only one processing element 260, a plurality of processing elements may be included in the processing system in order to process a plurality of convolution operations in a parallel manner.

The post-processor 270 may post-process the convolution operation result of the processing element 260. The post-processor 270 may perform functions such as pooling for finding an average or a maximum value for each pixel, an activation function (e.g., rectified linear unit (ReLU) or sigmoid) for filtering data based on a threshold, and normalizing for filtering a value departing from a result value. The processing result of the post-processor 270 may be transferred to the bus interface 230, and transferred to the host through the host interface 240.

The processing system 200 may be implemented with one or a plurality of integrated circuit chips. For example, the processing system 200 may be included in one integrated circuit chip in the form of a system-on chip. Alternatively, the processing system 200 may be implemented with a plurality of integrated circuit chips in such a manner that the main memory 210 is included in one integrated circuit chip and the other elements 220, 230, 240, 250, 260, and 270 are included in another integrated circuit chip.

Figure 3:
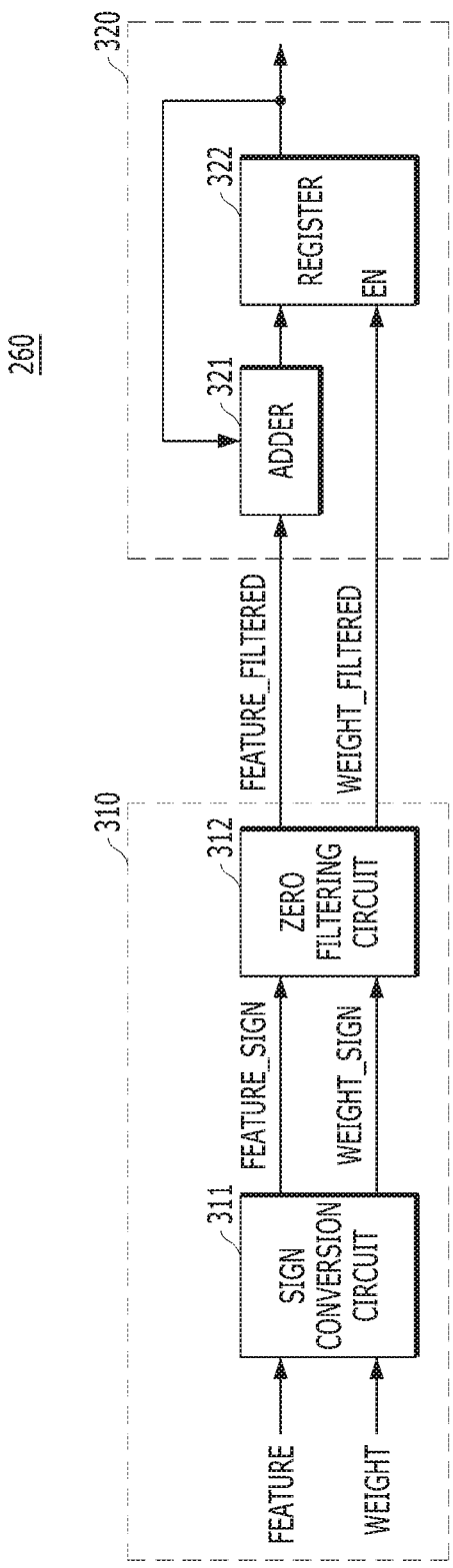
FIG. 3 is a diagram illustrating a processing element in accordance with an embodiment.

FIG. 3 is a diagram illustrating the processing element 260 in accordance with an embodiment.

Referring to FIG. 3, the processing element 260 may include a pre-processing circuit 310 and an accumulation circuit 320.

The pre-processing circuit 310 may receive and filter the features FEATURE and the weights WEIGHT, and output a filtered feature FEATURE_FILTERED and a filtered weight WEIGHT_FILTERED. The filtered weight WEIGHT_FILTERED may be one of not three values but two values. That is, the filtered weight WEIGHT_FILTERED is changed from ternary to binary, which may indicate that the number of bits of the filtered weight WEIGHT_FILTERED is changed from 2 bits to 1 bit. The pre-processing circuit 310 may include a sign conversion circuit 311 and a zero filtering circuit 312.

The sign conversion circuit 311 may perform an operation of multiplying the feature FEATURE and the weight WEIGHT by a value of −1 when the weight WEIGHT has a value of −1. As a consequence, a value of −1 is removed from the weight WEIGHT_SIGN processed by the sign conversion circuit 311 and the weight may have one of two values of 0 and 1. In the operation of the sign conversion circuit 311 that multiplies the feature FEATURE and the weight WEIGHT by a value of −1, an actual multiplication operation is not required and a sign is simply changed such as changing+ to − or changing− to +. In FIG. 4, FEATURE and WEIGHT indicate the feature FEATURE and the weight WEIGHT inputted to the sign conversion circuit 311, and FEATURE_SIGN and WEIGHT_SIGN indicate a feature and a weight outputted from the sign conversion circuit 311. Referring to FIG. 4, when the weight has a value of −1, the feature and the weight are multiplied by a value of −1 and the weight outputted from the sign conversion circuit 311 has one of the two values of 0 and 1.

The zero filtering circuit 312 may perform an operation of changing the weight WEIGHT_SIGN to 0 when the feature FEATURE_SIGN has a value of 0. Furthermore, the zero filtering circuit 312 may perform an operation of changing the feature FEATURE_SIGN to 0 when the weight WEIGHT_SIGN has a value of 0. It is essential to perform the operation of changing the weight WEIGHT_SIGN to 0 when the feature FEATURE_SIGN has a value of 0. However, the operation of changing the feature FEATURE_SIGN to 0 when the weight WEIGHT_SIGN has a value of 0 may not be performed. This is because, when the value of the filtered weight WEIGHT_FILTERED has a value of 0, the accumulation circuit 320 does not accumulate the value of the filtered feature FEATURE_FILTERED. Referring to the filtered feature FEATURE_FILTERED and the filtered weight WEIGHT_FILTERED of FIG. 4, when one of the feature FEATURE_SIGN and the weight WEIGHT_SIGN inputted to the zero filtering circuit 312 has a value of 0, the two values are all changed to 0.

Although FIG. 3 illustrates as an example that the sign conversion circuit 311 is located at the previous stage of (that is, stage before) the zero filtering circuit 312 in the pre-processing circuit 310, in an embodiment, the zero filtering circuit 312 may also be located at the previous stage of the sign conversion circuit 311. That is, after the processing operation of the zero filtering circuit 312 for the feature FEATURE and the weight WEIGHT is performed, the processing operation of the sign conversion circuit 311 may be performed.

The accumulation circuit 320 may accumulate the value of the filtered feature FEATURE_FILTERED. Since the value of the weight WEIGHT_FILTERED already filtered by the pre-processing circuit 310 has been reduced to values of 0 and 1 and the value of the filtered feature FEATURE_FILTERED has also been changed to a value of 0 when the value of the filtered weight has a value of 0, the accumulation circuit 320 may also receive and accumulate only the filtered feature FEATURE_FILTERED. FIG. 3 illustrates an example in which the accumulation circuit 320 receives the filtered weight WEIGHT_FILTERED and uses the filtered weight WEIGHT_FILTERED as an activation signal of a register 322. The accumulation circuit 320 may include an adder 321 and the register 322.

The adder 321 may perform an addition operation of adding the filtered feature FEATURE_FILTERED and the cumulative value stored in the register 322. The register 322 may store the operation result of the adder 321 as a cumulative value. The register 322 may use the filtered weight WEIGHT_FILTERED as the activation signal. That is, when the filtered weight WEIGHT_FILTERED has a value of 1, the register 322 may receive and store the operation result of the adder 321. When the filtered weight WEIGHT_FILTERED has a value of 0, the register 322 may substantially maintain the cumulative value as is without receiving a new input value.

As a consequence, the accumulation circuit 320 accumulates the values '1' of filtered weights WEIGHT_FILTERED among filtered features FEATURE_FILTERED. That is, the cumulative value of the accumulation circuit 320 may be 0.5 (=0.3+0.2). Accordingly, this is substantially the same as the result of the convolution operation for the image 110 and the filter 120 in FIG. 1.

In the processing element 260 of FIG. 3, the weight WEIGHT is changed from the ternary to the binary by the pre-processing circuit 310. That is, the weight WEIGHT may be changed from 2 bits to 1 bit. Furthermore, when at least one of the feature FEATURE and the weight WEIGHT is 0, since the feature and the weight are all changed to 0, the accumulation circuit 320 may perform a convolution operation by adding only the value of the filtered feature FEATURE_FILTERED. That is, it is possible to remove a multiplier from the processing element 260, so that it is possible to reduce the complexity and current consumption of the processing element 260.

FIG. 3 and FIG. 4 illustrate an example in which the sign conversion circuit 311 changes the weights from ternary (e.g., values of 1, 0, or −1) to binary (e.g., values of 1 or 0). Alternatively, the sign conversion circuit 311 may also change the weights from ternary (e.g., values of 1, 0, or −1) to binary (e.g., values of −1 or 0). That is, when the weight WEIGHT is 1, the sign conversion circuit 311 performs an operation of multiplying the feature FEATURE and the weight WEIGHT by −1. FIG. 5 illustrates these processes. In such a case, the accumulation circuit 320 may accumulate the values '−1' of filtered weights WEIGHT_FILTERED among filtered features FEATURE_FILTERED. When the processing element 260 operates as illustrated in FIG. 5, the sign of the operation result may be reversed compared with the case where the processing element 260 operates as illustrated in FIG. 4, which may be solved by simply reversing the sign of the operation result.

Although various embodiments have been described for illustrative purposes, it will be apparent to those skilled in the art that various changes and modifications may be made without departing from the spirit and scope of the invention as defined in the following claims.

What is claimed is:

1. A processing element comprising:
   a pre-processing circuit configured to receive and filter a feature and a weight and output a filtered feature and a filtered weight; and
   an accumulation circuit configured to accumulate a value of the filtered feature,
   wherein the pre-processing circuit comprises:
   a sign conversion circuit configured to change a sign of the feature and a sign of the weight when the weight has a value of −1; and
   a zero filtering circuit configured to change a value of the weight to 0 when the feature has a value of 0.

2. The processing element of claim 1, wherein the accumulation circuit accumulates the value of the filtered feature when the value of the filtered feature is 1.

3. The processing element of claim 1, wherein the feature and the weight received by to the pre-processing circuit are processed by the sign conversion circuit, and the feature and the weight processed by the sign conversion circuit are processed by the zero filtering circuit, so that the filtered feature and the filtered weight are generated.

4. The processing element of claim 1, wherein the feature and the weight received by to the pre-processing circuit are processed by the zero filtering circuit, and the feature and the weight processed by the zero filtering circuit are processed by the sign conversion circuit, so that the filtered feature and the filtered weight are generated.

5. The processing element of claim 1, wherein the zero filtering circuit changes a value of the feature to 0 when a value of the weight is 0.

6. The processing element of claim 1, wherein the accumulation circuit comprises:
   an adder configured to add a cumulative value and the value of the filtered feature; and
   a register configured to store an addition result of the adder as the cumulative value when the filtered weight is 1.

7. The processing element of claim 1, wherein the weight received by to the pre-processing circuit has a value of 1, 0, or −1.

8. A processing element comprising:
a pre-processing circuit configured to receive and filter a feature and a weight and output a filtered feature and a filtered weight; and
an accumulation circuit configured to accumulate a value of the filtered feature,
wherein the pre-processing circuit comprises:
a sign conversion circuit configured to change a sign of the feature and a sign of the weight when the weight has a value of 1; and
a zero filtering circuit configured to change a value of the weight to 0 when the feature having a value of 0.

9. The processing element of claim 8, wherein the accumulation circuit accumulates the value of the filtered feature when the value of the filtered weight is −1.

10. The processing element of claim 8, wherein the zero filtering circuit changes a value of the feature to 0 when a value of the weight is 0.

11. A processing system comprising:
a cache memory configured to store a feature and a weight; and
a processing element configured to operate the feature and the weight transferred from the cache memory,
wherein the processing element comprises:
a pre-processing circuit configured to receive and filter the feature and the weight and output a filtered feature and a filtered weight; and
an accumulation circuit configured to accumulate a value of the filtered feature, and
the pre-processing circuit comprises:
a sign conversion circuit configured to change a sign of the feature and a sign of the weight when the weight has a value of −1; and
a zero filtering circuit configured to change a value of the weight to 0 when the feature has a value of 0.

12. The processing system of claim 11, wherein the accumulation circuit accumulates the value of the filtered feature when the value of the filtered feature has a value of 1.

13. The processing system of claim 11, further comprising:
a host interface for communication with a host;
a memory configured to store data;
a memory interface configured to access the data of the memory;
a bus interface configured to provide interfacing among the host interface, a memory interface, and the cache memory; and
a post-processor configured to post-process an operation result of the processing element.

14. The processing system of claim 11, wherein the feature and the weight received by to the pre-processing circuit are processed by the sign conversion circuit, and the feature and the weight processed by the sign conversion circuit are processed by the zero filtering circuit, so that the filtered feature and the filtered weight are generated.

15. The processing system of claim 11, wherein the feature and the weight received by to the pre-processing circuit are processed by the zero filtering circuit, and the feature and the weight processed by the zero filtering circuit are processed by the sign conversion circuit, so that the filtered feature and the filtered weight are generated.

16. The processing system of claim 11, wherein the zero filtering circuit changes a value of the feature to 0 when value of the weight is 0.

17. The processing system of claim 11, wherein the accumulation circuit comprises:
an adder configured to add a cumulative value and the value of the filtered feature; and
a register configured to store an addition result of the adder as the cumulative value when the filtered weight has a value of 1.

18. The processing system of claim 11, wherein the weight inputted to the pre-processing circuit has a value of 1, 0, or −1.

19. A processing system comprising:
a cache memory configured to store a feature and a weight; and
a processing element configured to operate the feature and the weight transferred from the cache memory,
wherein the processing element comprises:
a pre-processing circuit configured to receive and filter the feature and the weight and output a filtered feature and a filtered weight; and
an accumulation circuit configured to accumulate a value of the filtered feature, and
the pre-processing circuit comprises:
a sign conversion circuit configured to change a sign of the feature and a sign of the weight when the weight has a value of 1; and
a zero filtering circuit configured to change a value of the weight to 0 when the feature has a value of 0.

20. The processing system of claim 19, wherein the accumulation circuit accumulates the value of the filtered feature when the value of the filtered weight has a value of −1.

21. The processing system of claim 19, further comprising:
a host interface for communication with a host;
a memory configured to store data;
a memory interface configured to access the data of the memory;
a bus interface configured to provide interfacing among the host interface, the memory interface, and the cache memory; and
a post-processor configured to post-process an operation result of the processing element.

22. The processing system of claim 19, wherein the zero filtering circuit changes a value of the feature to 0 when the weight has a value of 0.

23. The processing system of claim 19, wherein the accumulation circuit comprises:
an adder configured to add a cumulative value and the value of the filtered feature; and
a register configured to store an addition result of the adder as the cumulative value when the filtered weight having a value of −1.

* * * * *